(Model.)

4 Sheets—Sheet 1.

W. B. HOWE.
WRAPPER FOLDING MACHINE.

No. 294,470. Patented Mar. 4, 1884.

Witnesses:
Frank J. Blanchard
W. W. Elliott

Inventor:
Warren B. Howe (Model.) 4 Sheets—Sheet 2.
W. B. HOWE.
WRAPPER FOLDING MACHINE.

No. 294,470. Patented Mar. 4, 1884.

Witnesses:
Frank J. Blanchard
W. W. Elliott

Inventor:
Warren B Howe (Model.)

W. B. HOWE.
WRAPPER FOLDING MACHINE.

No. 294,470.        Patented Mar. 4, 1884.

Witnesses:
Frank J. Blanchard
W. W. Elliott

Inventor:
Warren B Howe (Model.) 4 Sheets—Sheet 4.
W. B. HOWE.
WRAPPER FOLDING MACHINE.

No. 294,470. Patented Mar. 4, 1884.

Witnesses.
Will Rossiter.
David B. Keeler.

Inventor
Warren B. Howe

UNITED STATES PATENT OFFICE.

WARREN B. HOWE, OF CHICAGO, ILLINOIS.

WRAPPER-FOLDING MACHINE.

SPECIFICATION forming part of Letters Patent No. 294,470, dated March 4, 1884.

Application filed January 2, 1883. (Model.)

*To all whom it may concern:*

Be it known that I, WARREN B. HOWE, a citizen of the United States, residing in Chicago, in the county of Cook, State of Illinois, have invented a new and useful folding-machine for forming wrappers for or upon suitable quantities of small merchandise for a packet, of which the following is a specification.

My invention relates to improvements in folding-machines for forming wedge-shaped or prismatic-like wrappers for holding merchandise of various kinds—such as coffee, tea, starch, dried fruit, assorted candies, &c.—but is particularly herein described as adapted for forming wedge-shaped or prismatic-like packets consisting of small merchandise inclosed within a flexible wrapper, and also more particularly for forming wedge-shaped or prismatic-like packets consisting of a flexible wrapper containing candy sticks or similar-shaped articles of merchandise.

The objects of my invention are to provide suitable mechanism, first, for closing down one end of the wrapper-blank, overlapping the other upon the base of the packet, and holding these ends in place till the finishing flaps of the wrapper are formed and pressed; second, for folding in the sides of the wrapper-blank projecting from the ends of the die against the two ends of the male die when small merchandise is to be packed, or against the ends of the candy sticks when such or similar-shaped goods are to be packed, and at the same time creasing each of these projecting sides of the wrapper, so that they will stay in place ready for the next folding; third, for folding the remaining part of these two ends of the wrapper upon the part just folded, and at the same time forming finishing flaps of the wrapper by creasing and pressing them; and, finally, for closing the finishing flaps one upon the other upon the base of the packet.

I attain these objects by the mechanism illustrated in the accompanying drawings, in which like letters of reference in the different figures indicate like parts.

Figure 1:
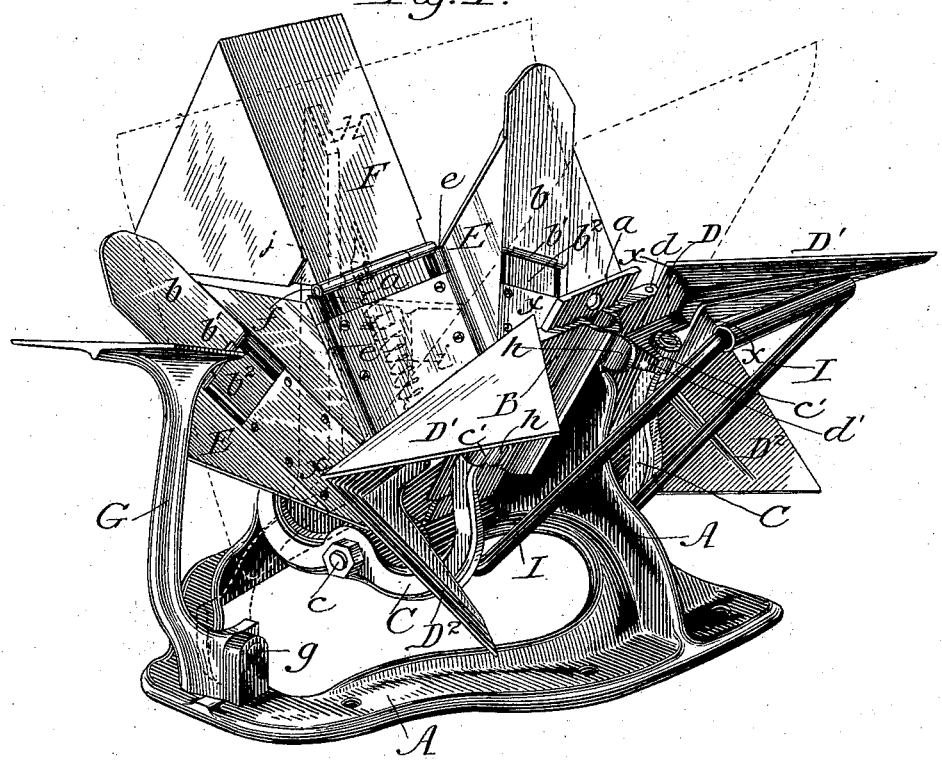
Figure 2:
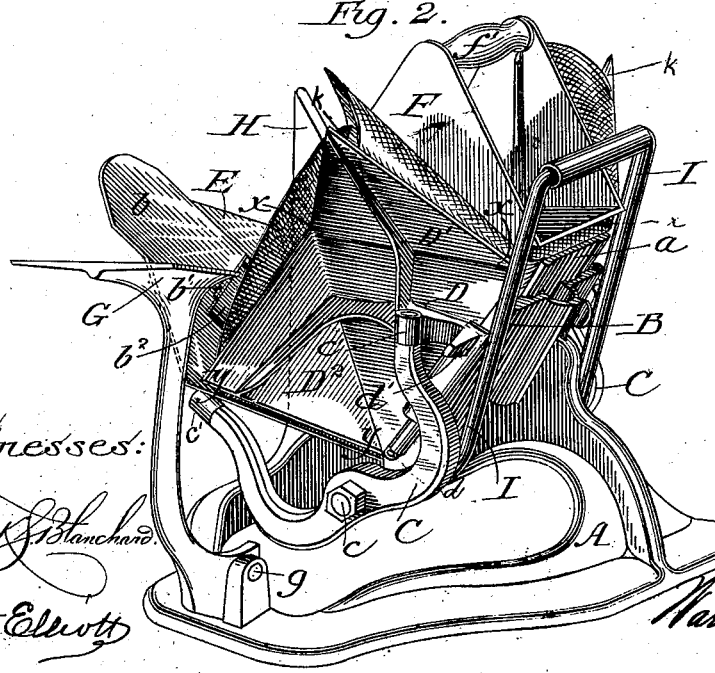
Figure 3:
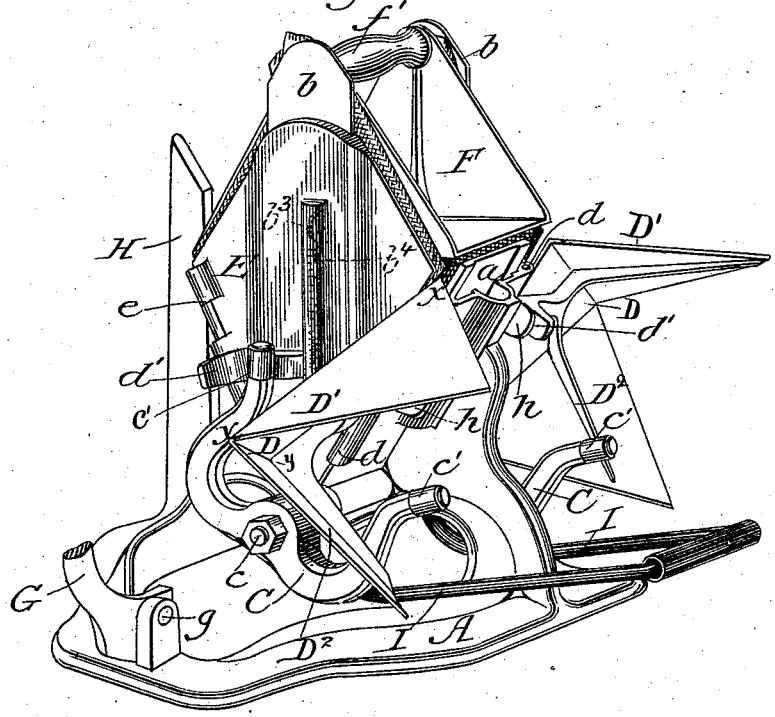
Figure 4:
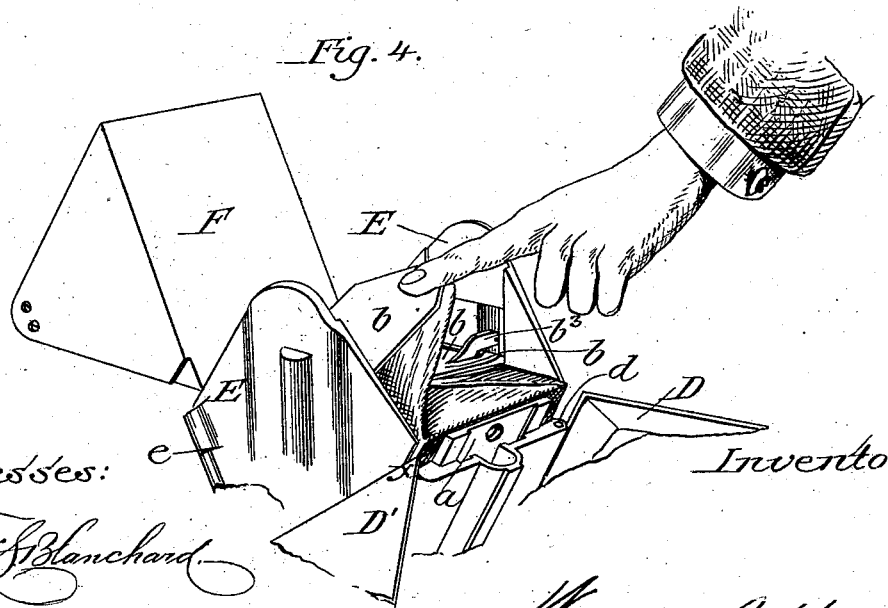
Figure 5:
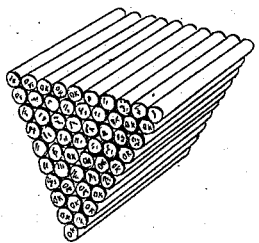
Figure 6:
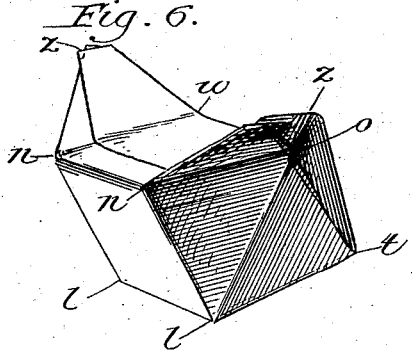
Figure 7:
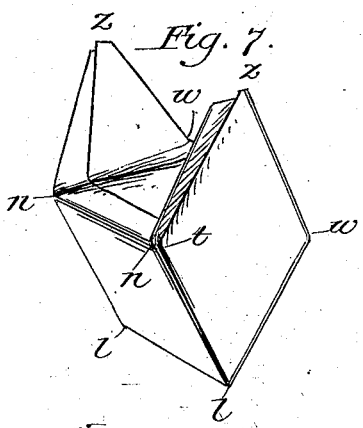
Figure 8:
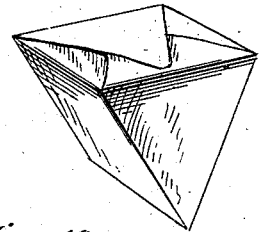
Figure 9:
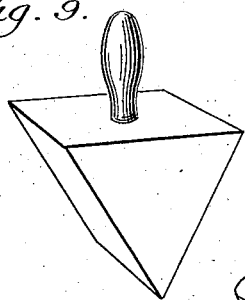
Figure 10:
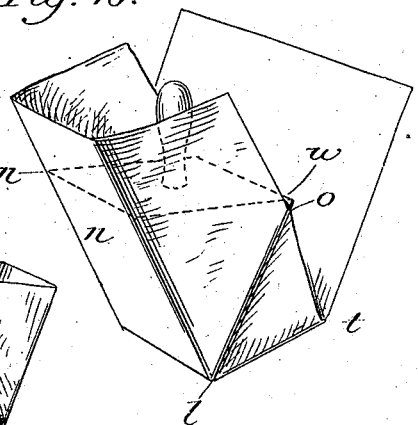
Figure 11:
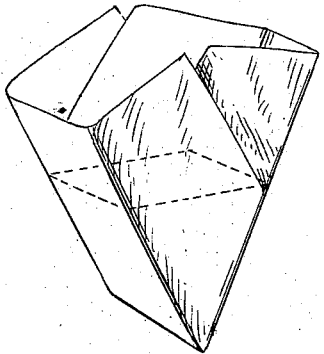
Figure 12:
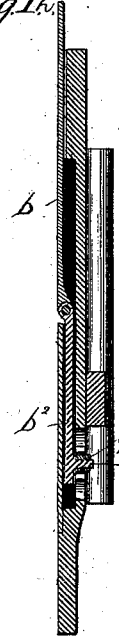
Figure 13:
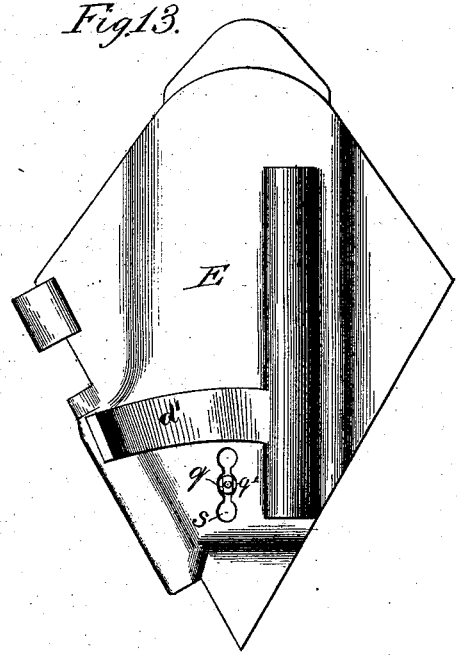
Figure 14:
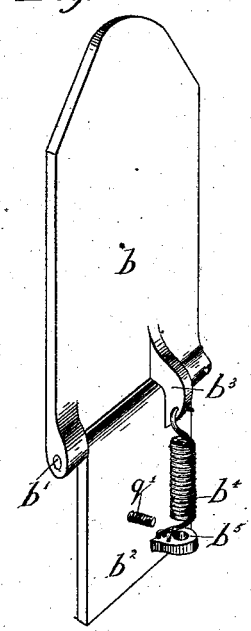
Figure 15:
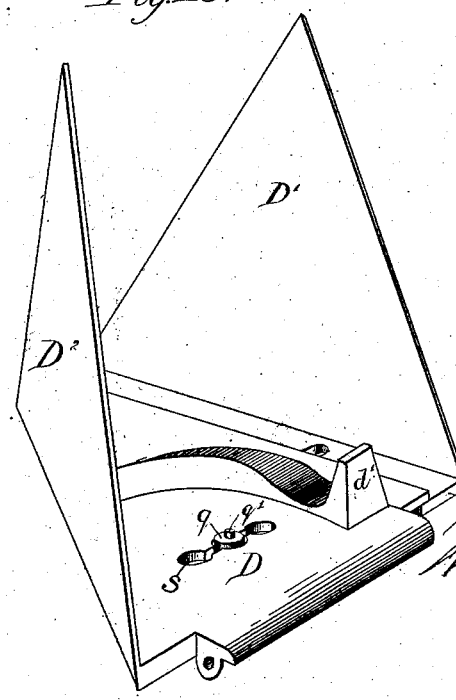

Figure 1 represents a perspective upright view of a machine embodying my invention, the parts of which are in position to receive the wrapper and candy sticks to form a packet, and also represents by dotted lines the wrapper in position and the gage properly set to receive the contents of the packet, such as candy sticks and similar-shaped goods. Fig. 2 is a perspective upright view of my machine containing the wrapper and candy sticks, with the two ends of the wrapper overlapping each other upon the base of the packet and held in place, and also one side of each of the other two projecting ends of the wrapper folded against the candy sticks and the wrapper creased and pressed so that it will stay in place ready for the next folding. Fig. 3 is a perspective view of my machine containing the wrapper and candy sticks, with the remaining sides of the two projecting ends of the wrapper closed upon the part just folded, as shown in Fig. 2, and the finishing-flaps formed and pressed into shape. Gage G is broken away in this view. Fig. 4 is a perspective view of the top part of my machine containing the wrapper and contents, having one of the finishing-flaps folded down upon the base and the other in process of folding to finish the packet. Fig. 5 is a perspective view of the candy sticks to form a packet by my machine, having the wrapper removed. Fig. 6 is a perspective view of a packet with the folding of the wrapper carried to that stage shown in Fig. 2 of my machine. Fig. 7 is a perspective view of the packet with the folding of the wrapper carried to that stage shown in Fig. 3 of my machine. Fig. 8 is a perspective view of the completed packet. Fig. 9 is a perspective view of a male die used in forming the wrapper when such goods as coffee, starch, assorted candies, &c., are to be packed. Fig. 10 is a perspective view of the wrapper formed upon a male die, folded to that stage at which the die is to be removed, the goods to be packed put in its place and the packet completed. Fig. 11 is a perspective view of a wrapper formed over a male die by means of my machine, to be nested with others for future use. Fig. 12 represents a sectional view of folding-wings E E, showing the adjustable features in broken section. Fig. 13 represents an outer view of folding-wing E, showing plainly slot $s$, nut $q$, and screw $q'$, which are means of adjusting folding-blades $b\ b$. Fig. 14 represents a view in detail of folding-blade $b$, plate $b^2$, lugs $b^3\ b^5$, spiral spring $b^4$, and screw $q'$. Fig. 15 represents an outer view of folding-wings D D, showing means for adjusting blades D' D'.

A represents the frame of my machine, provided with lugs, to which is hinged the gage G at g. Frame A is also provided with a rigid upright stop, H, (shown plainly in Fig. 3,) to operate as a stop to cap F, the upper and center part of frame A being of such shape as to receive and hold the female die B. Frame A is also provided with a transverse pivot-hole just underneath the apex of the V-shaped female die B, for inserting the transverse pivot c, connecting rigidly the two operating-cams C C.

B represents the female die, open at the V-shaped ends, and mounted and suitably fastened upon the frame A, and provided with slides a a', adjustable by means of thumb-screws h h on both sides die B. Slide a' is also provided with suitable attachments for spiral spring i, similar to attachment b⁵ shown upon plate b², Fig. 14.

D D represent two folding-wings, hinged to female die B at d d, provided with folding-blades D² D², attached rigidly to folding-wings D D along the lines x y, x y, at a right angle with wings D D, for the purpose of pressing the folds of the wrapper along the lines l t, l o, and l w, as shown in Fig. 6, against the folding-wings E E, so that the wrapper will stay in place as folded, preparatory to the next folding, as shown plainly in Fig. 2. The folding-wings D D are also provided with blades D' D', attached rigidly to folding-wings D D at an obtuse angle along the lines x x, x x, for the purpose of creasing the wrapper along the lines n o, n z, as shown in Fig. 6, preparatory to forming the folds of the finishing-flaps and pressing them into shape, as shown in Fig. 2, along the lines k x, k x, and x x, x x. Blades D' D' may be made adjustable, when it is desired to adapt the machine to fold different-sized packets, by means of slides provided with screw and nut passing into corrugated slots in folding-wings D D, as shown in Fig. 15, in which p represents a slide rigidly attached to blades D' D', incased within the face of folding-wings D D, and provided with screw q' and nut q, which are adapted to pass through and to be held in place at the several points of adjustment in slot s. The incasing and adjusting features are substantially the same as shown in Figs. 12, 13, and 14 for plates b² b². The folding-wings D D are also provided with J-hooked lugs d' d', to act in combination with the cams C C at e e, for the purpose of operating folding-wings D D. (Shown plainly in Fig. 2.)

E E represent two folding-wings, hinged to female die B at e e, provided with plates b² b², hinged to folding-blades at b' b'. Folding-blades b b and plates b² b² are provided with lugs b³ b³ and b⁵ b⁵. These lugs are connected by spiral spring b⁴ b⁴, for the purpose of carrying folding-blades b b back to their place after they have performed their functions.

The pivoted folding-blades b b are for the purpose of closing the finishing flaps of the packet, as shown in Fig. 4. Folding-blades b b may be made adjustable, when it is desired to adapt the machine to fold different-sized packets, by means of adjustable plates provided with screw and nut passing into corrugated slot in folding-wings E E, substantially as shown in Figs. 12 and 13, in which b' represents the plate incased within the face of folding-wing E, and provided with screw q' and nut q, which are adapted to pass through and to be held at the several points of adjustment in slot s, as shown in Figs. 12 and 13. Folding-wings E E are also provided with J-hooked lugs d' d' to act in combination with cams C C at e e, for the purpose of operating wings E E, as shown in Fig. 3.

F represents the cap, hinged to slide a' at f, provided with lug j, attached to spiral spring i, for the purpose of carrying cap F back to stop H after it has performed its function. Cap F is also provided with handle f', for operating it by hand. Cap F operates in holding down the overlapping ends of the wrapper, and combines with folding-wings E E and D D in creasing the folds of the wrapper, and combines with wings E E in pressing the finishing folds of the wrapper before they are closed down upon the base of the packet by folding-blades b b. Slides a a' and plate b² may be attached rigidly to die B and folding-wing E, respectively, substantially in the same way that slide p is attached to folding-wing D, as shown in Fig. 2, in which slide p is made a part of folding-wing D in the casting. The machine will then perform its functions in folding packages of uniform size; and it must be distinctly understood that I do not limit myself to a machine necessarily containing the adjustable features shown and described, nor to this exact mechanism.

C C represent the cams for operating the folding-wings E E and D D, and are provided with rollers c' c'. The operating-cams are attached rigidly to the transverse connecting-pivot c by means of the operating-handle I, the ends of which pass through the hub of the cams C C intersecting pivot c.

G represents the gage, hinged to frame A at g, operated by hand, and is for the purpose of evening the ends of the candy sticks preparatory to folding the wrapper upon them, as shown by dotted lines in Fig. 1, conforming in shape to end of die B.

I represents the operating-handle, attached rigidly to the cams C C and pivot c.

Having thus described the construction of my machine and the uses and operation of the several parts, I will now describe its practical operation in making wrappers and packets consisting of a wrapper containing candy sticks or other small merchandise.

To fold a sheet of paper to make a wrapper, one of suitable size is placed in the female die B, as shown by dotted lines in Fig. 1, and conformed thereto by means of a wedge-shaped male die similar to that shown in Fig. 9. By raising the operating-handle I the folding-wings D D are brought up into the position shown in Fig. 2, folding the wrapper to that stage shown in Fig. 10, the wrapper being creased along the lines $l\, t$, $l\, o$, $n\, l$, so that it will stay in place ready for the next folding. The operating-handle is then dropped, throwing the folding-wings D D back and bringing the folding-wings E E to the position shown in Fig. 3, and completing the folding of the wrapper, to be nested with others for future use, as shown in Fig. 11. Paste may be applied along the face $n\, o\, l$ of the wrapper before the last folding, when it is desired. Cap F is not used in the above-described process, nor are blades $b\, b$ and D' D' essential in this process. When it is desirable to complete the packet before removing the wrapper from the machine in packing coffee, starch, and other small merchandise, the male die is removed immediately after the wings D D are raised to form the first fold, and in its place are put the goods to be packed. One of the projecting ends of the wrapper is then folded down upon the base of the packet and creased upon blades D' D' along the lines $k\, x$, $k\, x$, and forming and creasing the folds of the wrapper along the lines $n\, z$, $n\, z$, as shown in Fig. 6, and the other projecting end is brought down by means of cap F, and the folding completed in same manner as from this stage in making packets containing candy sticks, hereinafter described.

In making packets composed of a wrapper containing candy sticks or other similar-shaped goods, the wrapper is first placed in the female die B, the gage G then lowered upon it by hand, as shown in dotted lines, Fig. 1. The candy sticks are then placed in the wrapper and evened against the V-shaped head of the gage G, forming a configuration similar to that shown in Fig. 5. Gage G is then raised by hand to the position shown in Fig. 2. The projecting end of the wrapper on the side of the die B next to operating-handle I is then folded over upon the top of the candy by hand, and the opposite projecting end of the wrapper is brought down and held in place, overlapping the first, by means of cap F, which is operated, preferably, in this movement by the left hand. By raising operating-handle I the machine assumes the position shown in Fig. 2, folding the wrapper to that stage shown in Fig. 6, and creasing the wrapper by means of rigid blades D' D' and $D^2\, D^2$ along the lines $l\, t$, $o\, n$, $n\, z$, and $n\, w$, as shown in Fig. 6. Then, by reversing the operating-handle I, the machine assumes the position shown in Fig. 3 and the packet that shown in Fig. 7, creasing and pressing the folds of the wrapper along the lines above mentioned and against the cap F, to form the finishing folds. By slightly raising the operating-handle I, cap F falls back to the stop H, and the finishing flaps are then folded down upon the base of the packet, one overlapping the other, by means of the folding-blades $b\, b$, operated by hand, as shown in Fig. 4, thus forming the completed packet, as shown in Fig. 8.

Having thus described my invention, what I claim, and desire to secure by Letters Patent, is—

1. In a folding-machine, the V-shaped female die B, in combination with the hinged triangular gage G, arranged and operating substantially as described and shown.

2. In a folding-machine, the female die B, V-shaped in cross-section, and provided with adjustable slides $a\, a'$, as and for the purposes specified, substantially as shown and described.

3. In a folding-machine, female die B, provided with adjustable slides $a\, a'$, in combination with cap F, hinged to the adjustable slide $a'$, substantially as shown and described.

4. In a folding-machine, cap F, in combination with female die B, arranged substantially as described, in combination with folding-wings E E and D D, operating to form and press the finishing-flaps of the wrapper, substantially as shown and described.

5. In a folding-machine, cap F, provided with handle $f'$ and lug $j$, in combination with spiral spring $i$, and adjustable slide $a'$, arranged so as to operate as and for the purposes specified, substantially as described.

6. In a folding-machine, the cams C C and means for pivoting and operating the same, substantially as described and shown, in combination with folding-wings E E and folding-wings D D, as and for the purposes shown and described.

7. In a folding-machine, the folding-wings D D, provided with rigid folding-blades $D^2\, D^2$, as and for the purposes specified, substantially as described and shown.

8. In a folding-machine, the folding-wings D D, provided with blades D' D' and rigid folding-blades $D^2\, D^2$, substantially as described, as and for the purposes specified.

9. In a folding-machine, folding-wings D D, provided with rigid folding-blades $D^2\, D^2$, and hinged to ends of female die B, and so arranged as to operate, in combination with folding-wings E E, to crease and press the end folds of the wrapper, substantially as described and shown.

10. The folding-wings D, folding-blades $D^2$, and folding-wings E, in combination with die B, arranged, substantially as described, to form, crease, and press the end folds of the wrapper.

11. The folding-wings D, blades $D^2$ and D', and die B, in combination with folding-wings E and cap F, arranged, substantially as described, to form, crease, and press the end folds and crease and press the finishing-flaps of the wrapper.

12. In a folding-machine, folding-wings E E, provided with adjustable slides $b^2\, b^2$, hinged to folding-blades $b\, b$ at $b'\, b'$, in combination with female die B, and hinged to it, so as to operate in forming and pressing the finishing folds of the wrapper, and also at the same time to operate in combination with cap F, in forming and pressing the finishing flaps of the packet, substantially as described.

13. In a folding-machine, the combination of frame A, die B, gage G, cap F, folding-wings D D, folding-wings E E, stop H, cams C C, and means for operating the same, substantially as described and shown.

14. In a folding-machine, folding-wings D D, provided with adjustable blades D' D' and folding-blades D² D², substantially as described, as and for the purposes specified.

15. The folding-wings D, blades D² and D', and die B, in combination with folding-wings E, cap F, and folding-blades b b, arranged, substantially as described, to form, crease, and press the end folds and crease, press, and fold the finishing flaps of the wrapper.

WARREN B. HOWE.

Witnesses:
W. W. ELLIOTT,
FRANK S. BLANCHARD.